(12) United States Patent
Shiratake et al.

(10) Patent No.: US 9,321,887 B2
(45) Date of Patent: Apr. 26, 2016

(54) POLYFORMAL RESIN COPOLYMER AND METHOD FOR PRODUCING THE SAME

(71) Applicant: MITSUBISHI GAS CHEMICAL COMPANY, INC., Tokyo (JP)

(72) Inventors: Munenori Shiratake, Chiba (JP); Yoshio Nishimura, Tokyo (JP); Noriyuki Kato, Tokyo (JP); Takashi Ishii, Kanagawa (JP); Hirohito Ishizuka, Ibaraki (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/439,469

(22) PCT Filed: Nov. 6, 2013

(86) PCT No.: PCT/JP2013/079996
§ 371 (c)(1),
(2) Date: Apr. 29, 2015

(87) PCT Pub. No.: WO2014/073559
PCT Pub. Date: May 15, 2014

(65) Prior Publication Data
US 2015/0284510 A1    Oct. 8, 2015

(30) Foreign Application Priority Data
Nov. 7, 2012 (JP) .................................. 2012-245123

(51) Int. Cl.
| C08G 63/02 | (2006.01) |
| C08G 65/40 | (2006.01) |
| G02B 1/04 | (2006.01) |
| G02C 7/00 | (2006.01) |
| C08G 64/00 | (2006.01) |

(52) U.S. Cl.
CPC ........ C08G 65/40 (2013.01); G02B 1/04 (2013.01); G02B 1/041 (2013.01); G02C 7/00 (2013.01)

(58) Field of Classification Search
CPC .............................. C08G 65/40; C08G 65/4006
USPC .......................................................... 528/219
See application file for complete search history.

(56) References Cited

U.S. PATENT DOCUMENTS

| 2006/0251900 A1* | 11/2006 | Heuer ............... B32B 27/08 428/412 |
| 2007/0100170 A1 | 5/2007 | Murase et al. |

FOREIGN PATENT DOCUMENTS

| JP | 60-188426 | 9/1985 | |
| JP | 2-124935 | 5/1990 | |
| JP | 2-194021 | 7/1990 | |
| JP | 2-304741 | 12/1990 | |
| JP | 3-162413 | 7/1991 | |
| JP | 3-212426 | 9/1991 | |
| JP | 3-221523 | 9/1991 | |
| JP | 3-237130 | 10/1991 | |
| JP | 5-025268 | 2/1993 | |
| JP | 6-145494 | 5/1994 | |
| JP | 6-228035 | 8/1994 | |
| JP | 8-53517 | 2/1996 | |
| JP | 8-100065 | 4/1996 | |
| JP | 2001-206863 | 7/2001 | |
| JP | 2006036648 | * 2/2006 | ........ C07D 311/96 |
| JP | 2010-132782 | 6/2010 | |
| JP | 2011-246583 | 12/2011 | |
| WO | 2003/064358 | 8/2003 | |

OTHER PUBLICATIONS

"Polymers", 1994, pp. 290, vol. 43 (discussed in Specification p. 1-4).
Search Report issued in International Patent Appl. No. PCT/JP2013/079996, dated Dec. 24, 2013.

* cited by examiner

*Primary Examiner* — Terressa Boykin
(74) *Attorney, Agent, or Firm* — Greenblum & Bernstein, P.L.C.

(57) ABSTRACT

Provided is a thermoplastic resin having a high refractive index, which is favorable as an optical material. Provided are a polyformal resin copolymer comprising a high refractive index diol that has a fluorene skeleton and an aromatic diol that has a low glass-transition point when polymerized, and a method for producing the same.

6 Claims, No Drawings

POLYFORMAL RESIN COPOLYMER AND METHOD FOR PRODUCING THE SAME

TECHNICAL FIELD

The present invention relates to a polyformal resin copolymer having a high refractive index, good heat resistance and fluidity suitable for molding, a method for producing the same, and the like.

BACKGROUND ART

Optical lenses are used not only for eyeglasses, but also for various applications, for example, optical systems in various cameras such as cameras, film-incorporated type cameras and video cameras. Examples of the important physical properties of such a lens material include a refractive index (nD) and an Abbe's number (v). In terms of optical design of an optical unit, in the case where a material with a high refractive index is used, a lens element having a surface with a smaller curvature can be realized. This has advantages in that it can minimize the aberration on this surface, reduce the number of lenses, reduce the eccentricity sensitivity of the lens, and reduce the lens thickness that allows miniaturization and weight reduction of the lens system. In addition, for the purpose of correcting the chromatic aberration, use of a combination of multiple lenses having different Abbe's numbers from each other is known.

As the lens material, optical glasses and optical transparent resins are widely used. Optical transparent resins have advantages such that they allow production of aspheric lenses by injection molding and that they are capable of mass production. Injection molding is a production technique in which plastic is softened by heating, forced into a mold by applying injection pressure so as to fill the mold for molding, left until the resin is cooled, and the molded body is taken out.

Although the fluidity of the resin can be enhanced by increasing the temperature for softening the resin, degradation and coloring of the resin tend to occur and thus the softening temperature is limited. Moreover, although molding die is kept at a constant temperature in many molding machines, if the machine uses pressurized water as a heating medium in a general mold temperature regulator, the mold temperature is about 150° C. at maximum. If surface accuracy of the product is required upon using this machine, the glass-transition temperature of the resin that can be used is limited to about 160° C. at maximum.

Among the optical transparent resins, polycarbonate containing bisphenol A (nD=1.586, v=30) and polystyrene (nD=1.578, v=34) are wildly used as high refractive index materials. Their uses vary depending on the difference in the chemical resistance, heat resistance and mechanical characteristics upon heating or the like.

An example of a method for further increasing the refractive index of a plastic material includes the method described in Non-patent Document 1. Theoretically, it is known to introduce an aromatic group or a sulfur molecule into a monomer molecular structure. For example, Patent Document 1 discloses a resin with a refractive index of 1.83. However, although a resin composition having a sulfur atom generally has a higher refractive index, it is known to have a problem of significantly poor light resistance. There are further problems that if the injection molding is performed continuously, the interior of the injection molding machine or the mold would be corroded with the sulfur-containing degradation gas, which renders industrial application difficult and that harmful gas or a sulfur compound is generated when plastic is disposed as waste.

As a material having a high refractive index among the sulfur-free optical resins, Patent Document 2 describes, in Example, a fluorene type polyformal that shows a refractive index of 1.66. Patent Document 3 describes, in Example, polycarbonate having a fluorene structure that shows a refractive index of 1.653 while Patent Document 4 describes, in Example, a copolymer of 2-vinylnaphthalene and styrene that shows a refractive index of 1.6637.

Now, the heat distortion temperature of the fluorene type polyformal that showed the refractive index of 1.66 in Patent Document 2 (Example 2) is high and thus the moldability is moderate, which is not specially good. The polyformal with good moldability (Example 1) did not give a sufficiently high refractive index. While Patent Document 3 discloses a polycarbonate resin, the polycarbonate showing the refractive index of 1.653 has a glass-transition point of 175° C. (Example 1) and one with a glass-transition temperature of 161° C. has a refractive index of 1.646 (Example 3). Patent Document 4 discloses a vinyl resin, where the resin with a refractive index of 1.6637 has a glass-transition temperature of 134.6° C. (Example 4). This copolymer is a copolymer of 2-vinylnaphthalene and styrene, which is a compound whose functional group on the chemical structural formula greatly differs from that of polyformal.

Next, prior art documents that describe compounds similar to the present invention in terms of chemical structural formulae will be illustrated. Patent Document 5 discloses a polycarbonate resin having repeat units derived from 9,9-bis(4-hydroxy-3-phenylphenyl)fluorene (hereinafter, also abbreviated as OPPFL). However, although these polycarbonate resins are described to have high glass-transition temperatures and thus high heat resistance, there are no description about their refractive indexes and birefringences.

For example, OPPFL is used to polymerize a polycarbonate in Patent Document 6. The resultant has a high refractive index of nd=1.656 as a homopolymer but also has high Tg, which is unsuitable as a molding material. In order to decrease Tg, copolymerization with bisphenol A or bis(4-hydroxy-3-methylphenyl)sulfide (hereinafter, abbreviated as HMPS) has been conducted. In a case of a copolymer whose moldability is kept at Tg=120° C. to 160° C., the refractive index value is relatively low.

An example of polyformal using a fluorene skeleton monomer is described in Patent Document 7. However, there is no example showing the use of 9,9-bis(4-hydroxy-3-phenylphenyl)fluorene. With respect to the physical properties, only heat resistance and photoelastic coefficient are mentioned, and there is no description about refractive index that is required as an optical lens.

Other examples using polyformal are described in Patent Documents 8 to 13 but there is no description about the refractive index.

Other examples that use polyformal and mention about the refractive index are described in Patent Document 2 as mentioned above and Patent Document 14. However, in these examples, when the refractive index value nd is relatively high, Tg is high as well, and thus requires a molding machine separately from the molding machine equipped with the above-mentioned general mold temperature regulator that uses pressurized water as a heating medium.

PRIOR ART DOCUMENTS

Patent Documents

Patent Document 1: Japanese Unexamined Patent Application Publication No. Heisei 08-100065

Patent Document 2: Japanese Unexamined Patent Application Publication No. Heisei 5-25268

Patent Document 3: Japanese Unexamined Patent Application Publication No. 2010-132782

Patent Document 4: Japanese Unexamined Patent Application Publication No. Heisei 8-53517

Patent Document 5: Japanese Unexamined Patent Application Publication No. Heisei 6-228035

Patent Document 6: Japanese Unexamined Patent Application Publication No. 2011-246583

Patent Document 7: Japanese Unexamined Patent Application Publication No. 1990-124935

Patent Document 8: Japanese Unexamined Patent Application Publication No. S60-188426

Patent Document 9: Japanese Unexamined Patent Application Publication No. 1990-194021

Patent Document 10: Japanese Unexamined Patent Application Publication No. 1991-221523

Patent Document 11: Japanese Unexamined Patent Application Publication No. 1991-162413

Patent Document 12: Japanese Unexamined Patent Application Publication No. 1991-212426

Patent Document 13: Japanese Unexamined Patent Application Publication No. 1991-237130

Patent Document 14: Japanese Unexamined Patent Application Publication No. 1994-145494

Non-Patent Document

Non-patent Document 1: Polymers, Vol. 43, page 290 (1994)

SUMMARY OF THE INVENTION

Solution to Problem

The present invention intends to solve the above-described problems, and has an objective of providing a polyformal resin copolymer having a high refractive index and good moldability.

Means for Solving the Problems

In order to solve the above-described problems, the present inventors have gone through intensive studies and found that the problems can be solved by a polyformal copolymer comprising structural units represented by General Formulae (1) and (2), thereby resulting in the present invention.

Thus, the present invention is as follows.

<1> A polyformal resin copolymer comprising a structural unit (a) represented by General Formula (1) and a structural unit (b) represented by General Formula (2), wherein the proportions of the structural unit (a) and the structural unit (b) are in a range of 1:99 to 99:1 in a molar ratio:

[Chemical Formula 1]

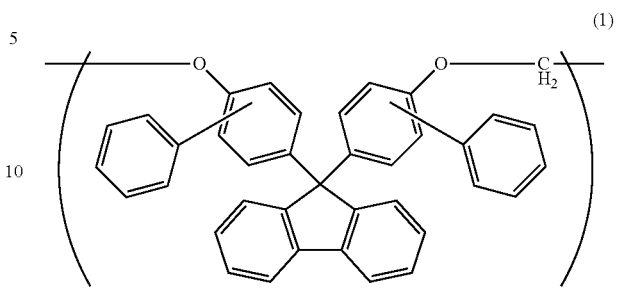

(1)

[Chemical Formula 2]

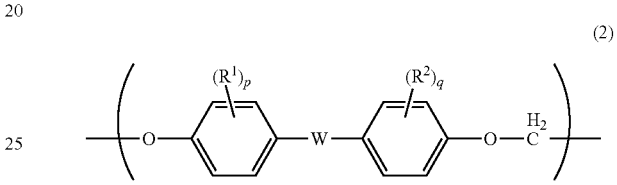

(2)

where, in General Formula (2), $R^1$ and $R^2$ are each independently a hydrocarbon group with a carbon atom number of 1 to 9 that does not contain an aromatic group or a halogen atom, p and q represent identical or different integers of 0 to 4, and W is any one of Formula (3) below:

[Chemical Formula 3]

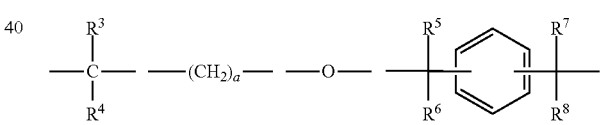

(3)

wherein, $R^3$ and $R^4$ each represent a hydrogen atom, a fluorine atom, a chlorine atom, a bromine atom, an iodine atom, an alkyl group with a carbon atom number of 1 to 9, an alkoxy group with a carbon atom number of 1 to 5, an aryl group with a carbon atom number of 6 to 12, an alkenyl group with a carbon atom number of 2 to 5 or an aralkyl group with a carbon atom number of 7 to 17; $R^3$ and $R^4$ may also bind to each other and form a carbocyclic ring or a heterocyclic ring; $R^5$ to $R^8$ each represent a hydrogen atom, a fluorine atom, a chlorine atom, a bromine atom, an iodine atom, an alkyl group with a carbon atom number of 1 to 9, an alkoxy group with a carbon atom number of 1 to 5 or an aryl group with a carbon number of 6 to 12; and a represents an integer of 1 to 20.

<2> A method for producing the polyformal resin copolymer according to <1>, comprising a step of allowing reaction among dihydric phenol represented by General Formula (4), dihydric phenol represented by General Formula (5) and methylene halide:

[Chemical Formula 4]

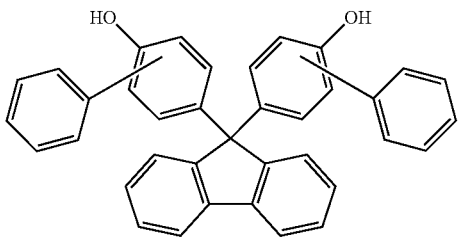

(4)

[Chemical Formula 5]

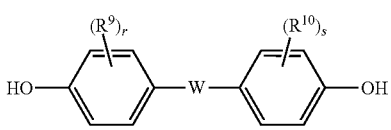

(5)

where, in General Formula (5), $R^9$ and $R^{10}$ are each independently a hydrogen atom, a hydrocarbon group with a carbon atom number of 1 to 9 that does not contain an aromatic group or a halogen atom, r and s represent identical or different integers of 0 to 4, and W is any one of General Formula (6) below:

[Chemical Formula 6]

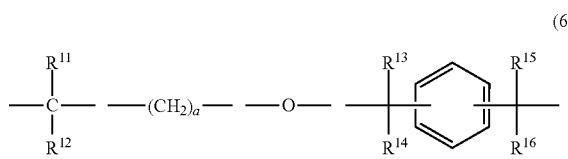

(6)

wherein, $R^{11}$ and $R^{12}$ each represent a hydrogen atom, a fluorine atom, a chlorine atom, a bromine atom, an iodine atom, an alkyl group with a carbon atom number of 1 to 9, an alkoxy group with a carbon atom number of 1 to 5, an aryl group with a carbon atom number of 6 to 12, an alkenyl group with a carbon atom number of 2 to 5 or an aralkyl group with a carbon atom number of 7 to 17; $R^{11}$ and $R^{12}$ may also bind to each other and form a carbocyclic ring or a heterocyclic ring; $R^{13}$ to $R^{16}$ each represent a hydrogen atom, a fluorine atom, a chlorine atom, a bromine atom, an iodine atom, an alkyl group with a carbon atom number of 1 to 9, an alkoxy group with a carbon atom number of 1 to 5 or an aryl group with a carbon number of 6 to 12; and a represents an integer of 1 to 20.

Also, the values of p, q, r and s above are preferably 0 to 2, more preferably 0 to 1 and particularly preferably 0. Moreover, the carbon numbers of the hydrocarbon groups ($R^1$, $R^2$, $R^9$ and $R^{10}$) are preferably 1 to 4, and more preferably 1.

<3> An optical molded body produced from the polyformal resin copolymer according to <1>.
<4> An optical lens produced from the polyformal resin copolymer according to <1>.
<5> The optical lens according to <4> produced from a polyformal resin copolymer whose refractive index is in a range of 1.600 to 1.680 and whose glass-transition temperature is 110° C. to 200° C.
<6> The polyformal resin copolymer according to <1>, wherein the refractive index is in a range of 1.600 to 1.680 and the glass-transition temperature is 110° C. to 200° C.

Effect of the Invention

A polyformal resin copolymer of the present invention shows a high refractive index and has good heat resistance and fluidity by allowing reaction among a specific bisphenol compound having a fluorene structure, aromatic diol and methylene halide at specific proportions.

Furthermore, the polyformal resin of the present invention can be used to provide an optical molded body having a high refractive index and good heat resistance and fluidity. Accordingly, the outcome in terms of industrial application is remarkable.

MODES FOR CARRYING OUT THE INVENTION

Hereinafter, the present invention will be described in detail.

A polyformal resin copolymer of the present invention comprises a structural unit (a) represented by General Formula (1) and a structural unit (b) represented by General Formula (2), wherein the proportions of the structural unit (a) and the structural unit (b) are in a range of 1:99 to 99:1 in a molar ratio.

<Raw Materials>

The present invention is synthesized using a dihydroxy compound containing a fluorene structure represented by General Formula (4), a bisphenol compound represented by General Formula (5) and methylene halide as raw materials.

Specific examples of the compound represented by General Formula (4) include 9,9-bis(4-hydroxy-3-phenylphenyl) fluorene and 9,9-bis(4-hydroxy-2-phenylphenyl)fluorene.

Examples of the compound represented by General Formula (5) include 1,1-bis(4-hydroxyphenyl)ethane (bisphenol E), 2,2-bis(4-hydroxyphenyl)propane (bisphenol A), 2,2-bis (4-hydroxy-3-methylphenyl)propane (bisphenol C), 2,2-bis (4-hydroxyphenyl)butane, 1,1-bis(4-hydroxyphenyl)-1-phenylethane, 1,1-bis(4-hydroxyphenyl)cyclohexane (bisphenol Z), 4,4'-dihydroxydiphenylmethane (bisphenol F), 1,1-bis(4-hydroxyphenyl)-3,3,5-trimethylcyclohexane, 2,2-bis(4-hydroxyphenyl)pentane, α,α'-bis(4-hydroxyphenyl)-m-diisopropylbenzene (bisphenol M), 2,2-bis[4-hydroxy-3-(2-butyl)-phenyl]propane (bisphenol OSBP) and 1,1-bis(4-hydroxyphenyl)-4-isopropylcyclohexane, which are favorable because of their high refractive indexes and good fluidity. Among them, bisphenol F, bisphenol M and bisphenol OSBP are particularly preferable because of their high refractive indexes, less coloring, and capability of enhancing fluidity. Two or more types of them can be used in combination.

(Composition)

A polyformal resin copolymer of the present invention comprises a structural unit (a) derived from the above-mentioned compound represented by General Formula (4) and a structural unit (b) derived from a compound represented by General Formula (5), wherein the molar ratio thereof (structural unit (a)/structural unit (b)) is 1/99 to 99/1. Preferably, it is 30/70 to 80/20. Particularly preferably, it is 40/60 to 60/40. If the proportion of the structural unit (a) is large, the refractive index tends to be high which is favorable whereas if the proportion of the structural unit (b) is large, the fluidity tends to be good which is favorable.

In addition, a monofunctional hydroxy compound such as phenol, p-tert-butylphenol, p-cumylphenol or long chain alkyl substituted phenol is used as a terminal blocking agent used for adjusting the degree of polymerization.

Furthermore, an antioxidant, a mold release agent, an ultraviolet absorbing agent, a fluidity modifier, a crystal nucleating agent, a reinforcing agent, a dye, an antistatic agent or an antimicrobial agent may preferably be added to the polyformal resin used with the present invention.

Moreover, a small amount of an antioxidant such as sodium sulfite or hydrosulfite sodium may also be added if necessary.

The polyformal resin contains the structural units (a) and (b) for 95% by weight or more, preferably 98% by weight or more and more preferably 99% by weight or more. Components other than these structural units are contained in the polyformal resin copolymer for 5% by weight or less, preferably 2% by weight or less and more preferably 1% by weight or less.

<Production Method>

A method for producing a polyformal resin copolymer of the present invention comprises synthesis through reacting the dihydroxy compound shown in General Formula (4), bisphenol shown in General Formula (5) and a chain polymerization terminator in a homogeneous solution of a methylene halide such as methylene chloride or methylene bromide and a preferable aprotic polar solvent such as N-methylpyrrolidone (NMP), dimethylformamide (DMF), dimethylsulfoxide (DMSO), N-methylcaprolactam (NMC), chlorobenzene, dichlorobenzene, trichlorobenzene or tetrahydrofuran (THF), in the presence of a base (preferably, sodium hydroxide or potassium hydroxide) at a temperature of 30 to 160° C. Preferable solvents are NMP, DMF, DMSO and NMC, particularly preferably NMP, NMC and DMSO and further particularly preferably NMP and NMC. The reaction may be conducted in two stages as follows. Specifically, diols represented by General Formulae (4) and (5) may be converted into a phenolate form with the solvent in a base, prior to the addition of methylene halide such as methylene chloride or methylene bromide. Regardless of whether the reaction is conducted in a single stage or in two stages, the organic phase is once washed and neutralized after the reaction, and then if necessary, cyclic impurities are separated by a precipitation method using a solvent that dissolves the cyclic compound (for example, acetone or methylethyl ketone), where the impurities are dissolved and kneaded in the solvent that is replaced for several times.

Alternatively, a cyclic polyformal or a polyformal resin copolymer may be separated in a preferable solvent by a precipitation method. The solvent does not serve as a solvent for the desired polymer but serves as a solvent for the undesired cyclic impurities. Preferably, they are compounds containing alcohol or ketone, examples being acetone and methylethyl ketone.

The reaction temperature is 30° C. to 160° C., preferably 40° C. to 100° C., particularly preferably 50° C. to 80° C. and further particularly preferably 60° C. to 80° C. Moreover, the reaction time, which may also be appropriately adjusted according to the reaction temperature, is 1 to 10 hours, preferably 1 to 5 hours and more preferably 1 to 3 hours.

<Physical Properties>
<Molecular Weight>

A weight-average molecular weight Mw of the polyformal or the polyformal resin copolymer of the present invention is in a range of 600 to 1,000,000, preferably 10,000 to 500,000, particularly preferably 30,000 to 250,000, further particularly preferably 60,000 to 120,000 and particularly 60,000 to 90,000. A GPC calibration curve is produced using tetrahydrofuran as a developing solvent and a polystyrene standard with a known molecular weight (molecular weight distribution=1). Calculation is carried out based on this calibration curve and the retention time of GPC.

<Composition Ratio>

Following determination with $^1$H-NMR, the polymer composition ratio is calculated based on the integration ratio thereof.

<Glass-Transition Temperature (Tg)>

Herein, a glass-transition temperature is determined with a Differential Scanning calorimeter (DSC). Unless otherwise stated, the determination takes place at a rate of temperature rise of 10° C./min in a nitrogen atmosphere.

A polyformal resin copolymer of the present invention has a glass-transition temperature of 110° C. to 200° C. A glass-transition temperature (Tg) of the polyformal resin copolymer is preferably 110° C. to 150° C. and more preferably 125° C. to 145° C.

<Fluidity of Resin>

A melt indexer is used for the measurement according to the method of JIS-K-7210. Unless otherwise stated, the measurement is conducted in MVR (cm$^3$/10 min) under the conditions of 260° C. and 2.16 kg.

A fluidity MVR of the polyformal resin copolymer of the present invention is 0 to 100, preferably 10 to 60 and more preferably 20 to 50.

<Refractive Index (nD) and ν>

The refractive index (nD) is determined using an Abbe's refractometer according to the method of BS-K-7142. The refractive index at wavelength nD=589 nm and at 23° C. is employed.

The polyformal resin copolymer of the present invention has a refractive index (nD) of 1.600 to 1.680. The refractive index (nD) of the polyformal resin copolymer is preferably about 1.620 to 1.677 and more preferably 1.630 to 1.670.

Abbe's number ν: calculated, with respect to a 0.1 mm-thick film made of a polyformal resin of the present invention, using the following formula based on the refractive indexes determined at wavelengths of 486 nm, 589 nm and 656 nm using an Abbe's refractometer at 23° C.

$$\nu=(nD-1)/(nF-nC)$$

nD: Refractive index at wavelength of 589 nm
nF: Refractive index at wavelength of 486 nm
nC: Refractive index at wavelength of 656 nm The Abbe's number ν of the polyformal resin copolymer of the present invention is 20 to 30.

<Method of Producing Molded Body>

The polyformal or the polyformal resin copolymer of the present invention may be fabricated according to a known method and may be processed into an article having any desired shape, for example, by an extrusion method or injection molding. Alternatively, a film may be produced by a solution technique or an extrusion method.

Other polymers such as aromatic polycarbonate and/or other aromatic polyester carbonate and/or other aromatic polyester may be mixed with the polyformal or the polyformal resin copolymer of the present invention according to a known method.

An additive commonly used as thermoplastic plastics, for example, a filler, an UV stabilizer, a thermostabilizer, an antistatic agent and a pigment or a dye may be added to the polyformal or the polyformal resin copolymer of the present invention at a common amount. Optionally, mold release ability, fluid ability and/or flame retardance may be improved by addition of an outer mold release agent such as glycerol monostearate (GMS), pentaerythritol tetrastearate (PETS) or fatty acid ester, a rheological additive and/or a flame retardant such as alkyl and aryl phosphite, phosphate, phosphane, low-molecular-weight carboxylic ester, a halogen compound and a combination thereof. The components mentioned in this paragraph such as the additive other than the polyformal resin are contained in the polyformal resin copolymer at 1% by weight or less, preferably 0.5% by weight or less and more preferably 0.3% by weight or less.

<Optical Molded Body>

An optical molded body produced with the polyformal resin of the present invention can be molded according to any method, for example, an injection molding technique, a compression molding technique, an extrusion molding technique or a solution casting technique. Since the polyformal resin of the present invention has good moldability and heat resistance, it can particularly advantageously be used for an optical lens that requires injection molding. Of course, since the polyformal resin of the present invention shows a high refractive index, good heat resistance, fluidity suitable for molding and unlikely to result optical distortion due to low birefringence, it can advantageously used for an optical molded body suitable for use as a structural or functional material of a liquid crystal display, an organic EL display, a transparent conductive substrate used in solar cell or the like, an optical disc, a liquid crystal panel, an optical card, a sheet, a film, optical fiber, a connector, a deposited plastic reflecting mirror, or an optical component of a display or the like.

If necessary, the surface of the optical molded body may be provided with a coat layer such as an antireflective layer or a hard coat layer. The antireflective layer may consist of either a single layer or multiple layers and either an organic substance or an inorganic substance, although it is preferably an inorganic substance. Specific examples include oxides and fluorides such as silicon oxide, aluminum oxide, zirconium oxide, titanium oxide, cerium oxide, magnesium oxide and magnesium fluoride.

<Optical Lens>

Since the optical lens of the present invention has a high refractive index and good heat resistance, it can be used in fields that conventionally use expensive high-refractive-index glass lenses such as telescopes, binoculars, television projectors and the like, and thus it is extremely useful. The optical lens made with the polyformal resin of the present invention can be used in a form of an aspheric lens as necessary. Since an aspheric lens is capable of keeping the spherical aberration substantially zero with a single lens, there is no need of eliminating the spherical aberration with a combination of multiple spherical lenses, which allows weight reduction and reduction in the production cost. Hence, an aspheric lens is particularly useful as a camera lens among the optical lenses.

With respect to Abbe's number, wider variety thereof allows a greater range of optical designs even at an identical refractive index, which is beneficial. For example, in the case of use as an aspheric lens, the thickness of the lens can favorably be reduced at a higher refractive index with lower Abbe's number. In the case of use as a convex lens, the thickness of the lens can be reduced at a higher refractive index with higher Abbe's number. It has an advantage of suppressing the thickness of the lens module as a whole.

A technique for molding an optical lens may be, for example, an injection molding technique, a compression molding technique or an injection compression molding technique.

EXAMPLES

Examples and Reference Examples

Hereinafter, the present invention will be illustrated by means of examples but the present invention should not in any way be limited to these examples.

Reference Example 50.26 g (0.1 mol) of 9,9-bis(4-hydroxy-3-phenylphenyl)fluorene (BisOPPFL), 0.06 g (0.0004 mol) of p-tertiary butylphenol, 15.4 g (0.23 mol) of potassium hydroxide (85 wt %) and 0.04 g (0.0002 mol) of sodium dithionite were put into a 300-ml four-neck flask equipped with an agitator and a heat/reflux tube, to which 101.9 g of N-methyl-2-pyrrolidone (NMP) and 131.4 g of methylene chloride was added while agitating in a nitrogen protective atmosphere. Following homogenization, the mixture was heated under reflux (70° C.) and agitated for 3 hours. The resultant was cooled to 25° C. before being diluted with 195 g of methylene chloride. The reaction solution was filtrated with Celite™ and washed with water in a separator for neutralization to remove the salt (electric conductivity: <15 µS·cm$^{-1}$). The organic layer was separated from the separator and added to 988 g of 2-butanone while agitating to precipitate a resin. Subsequently, the resin was washed with methanol and dried under reduced pressure at 100° C. and 5 mmHg or less for 8 hours. Finally, a total of 35 g of the resin was obtained.

Example 1

25.13 g (0.05 mol) of 9,9-bis(4-hydroxy-3-phenylphenyl)fluorene (BisOPPFL), 11.41 g (0.05 mol) of 4,4'-dihydroxy-2,2'diphenylpropane (BisA), 0.1 g (0.002 mol) of p-tertiary butylphenol, 15.4 g (0.23 mol) of potassium hydroxide (85 wt %) and 0.04 g (0.0002 mol) of sodium dithionite were put into a 300-ml four-neck flask equipped with an agitator and a heat/reflux tube, to which 101.9 g of N-methyl-2-pyrrolidone (NMP) and 131.4 g of methylene chloride were added while agitating in a nitrogen protective atmosphere. Following homogenization, the mixture was heated under reflux (70° C.) and agitated for 5 hours. The resultant was cooled to 25° C. before being diluted with 195 g of methylene chloride. The reaction solution was filtrated with Celite and washed with water in a separator for neutralization to remove the salt (electric conductivity: <15 µS·cm$^{-1}$). The organic layer was separated from the separator and added to methanol while agitating to precipitate a resin. Subsequently, the resin was washed with 80 g of methanol and dried under reduced pressure at 100° C. and 5 mmHg or less for 8 hours. Finally, a total of 25 g of the resin was obtained.

Example 2

25.13 g (0.05 mol) of 9,9-bis(4-hydroxy-3-phenylphenyl)fluorene (BisOPPFL), 12.81 g (0.05 mol) of 2,2'-bis(3-methyl-4-hydroxyphenyl)propane (BisC), 0.1 g (0.002 mol) of p-tertiary butylphenol, 15.4 g (0.23 mol) of potassium hydroxide (85 wt %) and 0.04 g (0.0002 mol) of sodium dithionite were put into a 300-ml four-neck flask equipped with an agitator and a heat/reflux tube, to which 101.9 g of N-methyl-2-pyrrolidone (NMP) and 131.4 g of methylene chloride were added while agitating in a nitrogen protective atmosphere. Following homogenization, the mixture was heated under reflux (70° C.) and agitated for 5 hours. The resultant was cooled to 25° C. before being diluted with 195 g of methylene chloride. The reaction solution was filtrated with Celite and washed with water in a separator for neutralization to remove the salt (electric conductivity: <15 µS·cm$^{-1}$). The organic layer was separated from the separator and added to 988 g of 2-butanone to precipitate a resin. Subsequently, the resin was washed with 80 g of methanol and dried under reduced pressure at 100° C. and 5 mmHg or less for 8 hours. Finally, a total of 30 g of the resin was obtained.

Example 3

45.23 g (0.09 mol) of 9,9-bis(4-hydroxy-3-phenylphenyl) fluorene (BisOPPFL), 2.00 g (0.01 mol) of 4,4'-methylene bisphenol (BisF), 0.1 g (0.002 mol) of p-tertiary butylphenol, 15.4 g (0.23 mol) of potassium hydroxide (85 wt %) and 0.04 g (0.0002 mol) of sodium dithionite were put into a 300-ml four-neck flask equipped with an agitator and a heat/reflux tube, to which 101.9 g of N-methyl-2-pyrrolidone (NMP) and 131.4 g of methylene chloride were added while agitating in a nitrogen protective atmosphere. Following homogenization, the mixture was heated under reflux (70° C.) and agitated for 5 hours. The resultant was cooled to 25° C. before being diluted with 195 g of methylene chloride. The reaction solution was filtrated with Celite and washed with water in a separator for neutralization to remove the salt (electric conductivity: <15 µS·cm$^{-1}$). The organic layer was separated from the separator and added to 988 g of 2-butanone while agitating to precipitate a resin. Subsequently, the resin was washed with 80 g methanol and dried under reduced pressure at 100° C. and 5 mmHg or less for 8 hours. Finally, a total of 30 g of the resin was obtained.

Example 4

40.21 g (0.08 mol) of 9,9-bis(4-hydroxy-3-phenylphenyl) fluorene (BisOPPFL), 4.00 g (0.02 mol) of 4,4'-methylene bisphenol (BisF), 0.1 g (0.002 mol) of p-tertiary butylphenol, 15.4 g (0.23 mol) of potassium hydroxide (85 wt %) and 0.04 g (0.0002 mol) of sodium dithionite were put into a 300-ml four-neck flask equipped with an agitator and a heat/reflux tube, to which 101.9 g of N-methyl-2-pyrrolidone (NMP) and 131.4 g of methylene chloride were added while agitating in a nitrogen protective atmosphere. Following homogenization, the mixture was heated under reflux (70° C.) and agitated for 5 hours. The resultant was cooled to 25° C. before being diluted with 195 g of methylene chloride. The reaction solution was filtrated with Celite and washed with water in a separator for neutralization to remove the salt (electric conductivity: <15 µS·cm$^{-1}$). The organic layer was separated from the separator and added to 988 g of 2-butanone while agitating to precipitate a resin. Subsequently, the resin was washed with 80 g methanol and dried under reduced pressure at 100° C. and 5 mmHg or less for 8 hours. Finally, a total of 35 g of the resin was obtained.

Example 5

25.13 g (0.05 mol) of 9,9-bis(4-hydroxy-3-phenylphenyl) fluorene (BisOPPFL), 10.00 g (0.05 mol) of 4,4'-methylene bisphenol (BisF), 0.1 g (0.002 mol) of p-tertiary butylphenol, 15.4 g (0.23 mol) of potassium hydroxide (85 wt %) and 0.04 g (0.0002 mol) of sodium dithionite were put into a 300-ml four-neck flask equipped with an agitator and a heat/reflux tube, to which 101.9 g of N-methyl-2-pyrrolidone (NMP) and 131.4 g of methylene chloride were added while agitating in a nitrogen protective atmosphere. Following homogenization, the mixture was heated under reflux (70° C.) and agitated for 5 hours. The resultant was cooled to 25° C. before being diluted with 195 g of methylene chloride. The reaction solution was filtrated with Celite and washed with water in a separator for neutralization to remove the salt (electric conductivity: <15 µS·cm$^{-1}$). The organic layer was separated from the separator and added to 988 g of 2-butanone while agitating to precipitate a resin. Subsequently, the resin was washed with 80 g methanol, and dried under reduced pressure at 100° C. and 5 mmHg or less for 8 hours. Finally, a total of 25 g of the resin was obtained.

Example 6

20.10 g (0.04 mol) of 9,9-bis(4-hydroxy-3-phenylphenyl) fluorene (BisOPPFL), 12.01 g (0.06 mol) of 4,4'-methylene bisphenol (BisF), 0.1 g (0.002 mol) of p-tertiary butylphenol, 15.4 g (0.23 mol) of potassium hydroxide (85 wt %) and 0.04 g (0.0002 mol) of sodium dithionite were put into a 300-ml four-neck flask equipped with an agitator and a heat/reflux tube, to which 101.9 g of N-methyl-2-pyrrolidone (NMP) and 131.4 g of methylene chloride were added while agitating in a nitrogen protective atmosphere. Following homogenization, the mixture was heated under reflux (70° C.) and agitated for 5 hours. The resultant was cooled to 25° C. before being diluted with 195 g of methylene chloride. The reaction solution was filtrated with Celite and washed with water in a separator for neutralization to remove the salt (electric conductivity: <15 µS·cm$^{-1}$). The organic layer was separated from the separator and added to 988 g of 2-butanone while agitating to precipitate a resin. Subsequently, the resin was washed with 80 g methanol, and dried under reduced pressure at 100° C. and 5 mmHg or less for 8 hours. Finally, a total of 25 g of the resin was obtained.

Example 7

5.03 g (0.01 mol) of 9,9-bis(4-hydroxy-3-phenylphenyl) fluorene (BisOPPFL), 18.02 g (0.09 mol) of 4,4'-methylene bisphenol (BisF), 0.1 g (0.002 mol) of p-tertiary butylphenol, 15.4 g (0.23 mol) of potassium hydroxide (85 wt %) and 0.04 g (0.0002 mol) of sodium dithionite were put into a 300-ml four-neck flask equipped with an agitator and a heat/reflux tube, to which 101.9 g of N-methyl-2-pyrrolidone (NMP) and 131.4 g of methylene chloride were added while agitating in a nitrogen protective atmosphere. Following homogenization, the mixture was heated under reflux (70° C.) and agitated for 5 hours. The resultant was cooled to 25° C. before being diluted with 195 g of methylene chloride. The reaction solution was filtrated with Celite and washed with water in a separator for neutralization to remove the salt (electric conductivity: <15 µS·cm$^{-1}$). The organic layer was separated from the separator and added to 988 g of 2-butanone while agitating to precipitate a resin. Subsequently, the resin was washed with 80 g methanol, and dried under reduced pressure at 100° C. and 5 mmHg or less for 8 hours. Finally, a total of 15 g of the resin was obtained.

Example 8

45.23 g (0.09 mol) of 9,9-bis(4-hydroxy-3-phenylphenyl) fluorene (BisOPPFL), 3.46 g (0.01 mol) of 1,3-bis(2-(4-hydroxyphenyl)-2-propyl)benzene (BisM), 0.1 g (0.002 mol) of p-tertiary butylphenol, 15.4 g (0.23 mol) of potassium hydroxide (85 wt %) and 0.04 g (0.0002 mol) of sodium dithionite were put into a 300-ml four-neck flask equipped with an agitator and a heat/reflux tube, to which 101.9 g of N-methyl-2-pyrrolidone (NMP) and 131.4 g of methylene chloride were added while agitating in a nitrogen protective atmosphere. Following homogenization, the mixture was heated under reflux (70° C.) and agitated for 5 hours. The resultant was cooled to 25° C. before being diluted with 195 g of methylene chloride. The reaction solution was filtrated with Celite and washed with water in a separator for neutralization to remove the salt (electric conductivity: <15 µS·cm$^{-1}$). The organic layer was separated from the separator and added to 988 g of 2-butanone while agitating to precipitate a resin. Subsequently, the resin was washed with 80 g methanol, and dried under reduced pressure at 100° C. and 5 mmHg or less for 8 hours. Finally, a total of 35 g of the resin was obtained.

Example 9

40.21 g (0.08 mol) of 9,9-bis(4-hydroxy-3-phenylphenyl)fluorene (BisOPPFL), 6.93 g (0.02 mol) of 1,3-bis(2-(4-hydroxyphenyl)-2-propyl)benzene (BisM), 0.1 g (0.002 mol) of p-tertiary butylphenol, 15.4 g (0.23 mol) of potassium hydroxide pellets (85%) and 0.04 g (0.0002 mol) of sodium dithionite were put into a 300-ml four-neck flask equipped with an agitator and a heat/reflux tube, to which 101.9 g of N-methyl-2-pyrrolidone (NMP) and 131.4 g of methylene chloride were added while agitating in a nitrogen protective atmosphere. Following homogenization, the mixture was heated under reflux (70° C.) and agitated for 5 hours. The resultant was cooled to 25° C. before being diluted with 195 g of methylene chloride. The reaction solution was filtrated with Celite and washed with water in a separator for neutralization to remove the salt (electric conductivity: <15 µS·cm$^{-1}$). The organic layer was separated from the separator and added to 988 g of 2-butanone while agitating to precipitate a resin. Subsequently, the resin was washed with 80 g methanol, and dried under reduced pressure at 100° C. and 5 mmHg or less for 8 hours. Finally, a total of 35 g of the resin was obtained.

Example 10

30.16 g (0.06 mol) of 9,9-bis(4-hydroxy-3-phenylphenyl)fluorene (BisOPPFL), 13.89 g (0.04 mol) of 1,3-bis(2-(4-hydroxyphenyl)-2-propyl)benzene (BisM), 0.1 g (0.002 mol) of p-tertiary butylphenol, 15.4 g (0.23 mol) of potassium hydroxide (85 wt %) and 0.04 g (0.0002 mol) of sodium dithionite were put into a 300-ml four-neck flask equipped with an agitator and a heat/reflux tube, to which 101.9 g of N-methyl-2-pyrrolidone (NMP) and 131.4 g of methylene chloride were added while agitating in a nitrogen protective atmosphere. Following homogenization, the mixture was heated under reflux (70° C.) and agitated for 5 hours. The resultant was cooled to 25° C. before being diluted with 195 g of methylene chloride. The reaction solution was filtrated with Celite and washed with water in a separator for neutralization to remove the salt (electric conductivity: <15 µS·cm$^{-1}$). The organic layer was separated from the separator and added to 988 g of 2-butanone while agitating to precipitate a resin. Subsequently, the resin was washed with 80 g methanol, and dried under reduced pressure at 100° C. and 5 mmHg or less for 8 hours. Finally, a total of 30 g of the resin was obtained.

Example 11

25.13 g (0.05 mol) of 9,9-bis(4-hydroxy-3-phenylphenyl)fluorene (BisOPPFL), 17.32 g (0.05 mol) of 1,3-bis(2-(4-hydroxyphenyl)-2-propyl)benzene (BisM), 0.1 g (0.002 mol) of p-tertiary butylphenol, 15.4 g (0.23 mol) of potassium hydroxide (85 wt %) and 0.04 g (0.0002 mol) of sodium dithionite were put into a 300-ml four-neck flask equipped with an agitator and a heat/reflux tube, to which 101.9 g of N-methyl-2-pyrrolidone (NMP) and 131.4 g of methylene chloride were added while agitating in a nitrogen protective atmosphere. Following homogenization, the mixture was heated under reflux (70° C.) and agitated for 5 hours. The resultant was cooled to 25° C. before being diluted with 195 g of methylene chloride. The reaction solution was filtrated with Celite and washed with water in a separator for neutralization to remove the salt (electric conductivity: <15 µS·cm$^{-1}$). The organic layer was separated from the separator and added to 988 g of 2-butanone while agitating to precipitate a resin. Subsequently, the resin was washed with 80 g methanol, and dried under reduced pressure at 100° C. and 5 mmHg or less for 8 hours. Finally, a total of 30 g of the resin was obtained.

Example 12

10.05 g (0.02 mol) of 9,9-bis(4-hydroxy-3-phenylphenyl)fluorene (BisOPPFL), 27.72 g (0.08 mol) of 1,3-bis(2-(4-hydroxyphenyl)-2-propyl)benzene (BisM), 0.1 g (0.002 mol) of p-tertiary butylphenol, 15.4 g (0.23 mol) of potassium hydroxide (85 wt %) and 0.04 g (0.0002 mol) of sodium dithionite were put into a 300-ml four-neck flask equipped with an agitator and a heat/reflux tube, to which 101.9 g of N-methyl-2-pyrrolidone (NMP) and 131.4 g of methylene chloride were added while agitating in a nitrogen protective atmosphere. Following homogenization, the mixture was heated under reflux (70° C.) and agitated for 5 hours. The resultant was cooled to 25° C. before being diluted with 195 g of methylene chloride. The reaction solution was filtrated with Celite and washed with water in a separator for neutralization to remove the salt (electric conductivity: <15 µS·cm$^{-1}$). The organic layer was separated from the separator and added to 988 g of 2-butanone while agitating to precipitate a resin. Subsequently, the resin was washed with 80 g methanol, and dried under reduced pressure at 100° C. and 5 mmHg or less for 8 hours. Finally, a total of 27 g of the resin was obtained.

Example 13

5.03 g (0.01 mol) of 9,9-bis(4-hydroxy-3-phenylphenyl)fluorene (BisOPPFL), 31.18 g (0.09 mol) of 1,3-bis(2-(4-hydroxyphenyl)-2-propyl)benzene (BisM), 0.1 g (0.002 mol) of p-tertiary butylphenol, 15.4 g (0.23 mol) of potassium hydroxide (85 wt %) and 0.04 g (0.0002 mol) of sodium dithionite were put into a 300-ml four-neck flask equipped with an agitator and a heat/reflux tube, to which 101.9 g of N-methyl-2-pyrrolidone (NMP) and 131.4 g of methylene chloride were added while agitating in a nitrogen protective atmosphere. Following homogenization, the mixture was heated under reflux (70° C.) and agitated for 5 hours. The resultant was cooled to 25° C. before being diluted with 195 g of methylene chloride. The reaction solution was filtrated with Celite and washed with water in a separator for neutralization to remove the salt (electric conductivity: <15 µS·cm$^{-1}$). The organic layer was separated from the separator and added to 988 g of 2-butanone while agitating to precipitate a resin. Subsequently, the resin was washed with 80 g methanol, and dried under reduced pressure at 100° C. and 5 mmHg or less for 8 hours. Finally, a total of 25 g of the resin was obtained.

Example 14

25.13 g (0.05 mol) of 9,9-bis(4-hydroxy-3-phenylphenyl)fluorene (BisOPPFL), 17.02 g (0.05 mol) of 2,2-bis[4-hydroxy-3-(2-butyl)-phenyl]propane (BisOSBP), 0.1 g (0.002 mol) of p-tertiary butylphenol, 15.4 g (0.23 mol) of potassium hydroxide (85 wt %) and 0.04 g (0.0002 mol) of sodium dithionite were put into a 300-ml four-neck flask equipped with an agitator and a heat/reflux tube, to which 101.9 g of N-methyl-2-pyrrolidone (NMP) and 131.4 g of methylene chloride were added while agitating in a nitrogen protective atmosphere. Following homogenization, the mixture was heated under reflux (70° C.) and agitated for 5 hours. The resultant was cooled to 25° C. before being diluted with 195 g of methylene chloride. The reaction solution was filtrated with Celite and washed with water in a separator for neutralization to remove the salt (electric conductivity: <15 μS·cm$^{-1}$). The organic layer was separated from the separator and added to 988 g of 2-butanone while agitating to precipitate a resin. Subsequently, the resin was washed with 80 g methanol, and dried under reduced pressure at 100° C. and 5 mmHg or less for 8 hours. Finally, a total of 30 g of the resin was obtained.

Comparative Examples 1-6

The same procedure as Example 1 was conducted except that the ratio of Monomers 1 and 2 was changed in Comparative Examples 1-6 as shown in Table 1. The results are shown in Table 1.

BisOPPFL refers to Compound (A1) represented by Chemical Formula (7). BisA refers to bisphenol A, BisC refers to bisphenol C, BisF refers to bisphenol F, BisM refers to bisphenol M, BisOSBP refers to Chemical Formula (8), and BPF refers to Fluorene compound (B) represented by Chemical Formula (9).

[Chemical Formula 7]

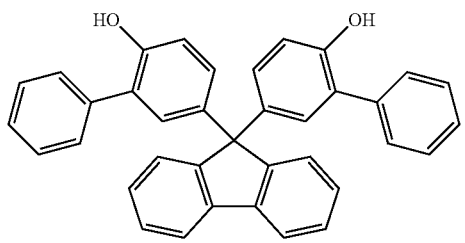

(7)

[Chemical Formula 8]

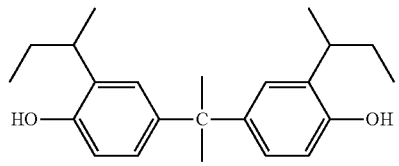

(8)

[Chemical Formula 9]

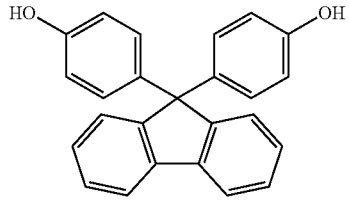

(9)

Mw, Tg, MVR, the refractive indexes and the Abbe's numbers shown in Table 1 are values determined according to the following methods.

<Molecular Weight (Mw)>

A GPC calibration curve was produced using tetrahydrofuran as a developing solvent and a polystyrene standard with a known molecular weight (molecular weight distribution=1). Calculation was done based on this calibration curve and the retention time of GPC.

<Composition Ratio>

Following determination with proton NMR (LA-500) from JEOL Ltd., the polymer composition ratio was calculated based on the integration ratio thereof.

<Glass-Transition Temperature (Tg)>

Glass-transition temperature was determined with a differential scanning calorimeter (DSC/SSC-5200) from Seiko Instruments Inc. Unless otherwise stated, the determination took place at a rate of temperature rise of 10° C./min in a nitrogen atmosphere.

<Fluidity of Resin>

A melt indexer from Toyo Seiki Seisaku-Sho was used for the measurement according to the method of JIS-K-7210. Unless otherwise stated, the measurement was conducted in MVR (cm$^3$/10 min) under the conditions of 260° C. and 2.16 kg.

<Refractive Index (nD) and ν>

The refractive index (nD) of a 0.1 mm-thick film made of a polyformal resin of the present invention was determined using an Abbe's refractometer according to the method of JIS-K-7142. Abbe's number was calculated using the following formula based on the refractive indexes determined at wavelengths of 486 nm, 589 nm and 656 nm at 23° C.

$$\nu=(nD-1)/(nF-nC)$$

nD: Refractive index at wavelength of 589 nm
nF: Refractive index at wavelength of 486 nm
nC: Refractive index at wavelength of 656 nm

TABLE 1

| | Monomer 1 | Feed ratio % mol | Monomer 2 | Feed ratio % mol | Mw | Tg [° C.] | MVR (g/10 cm$^3$) | Refractive index (nD) | Abbe's number (ν) |
|---|---|---|---|---|---|---|---|---|---|
| Reference Example | BisOPPFL | 100 | Not added | 0 | 63000 | 198 | less than 1 | 1.677 | 20 |
| Example 1 | BisOPPFL | 50 | Bis A | 50 | 61000 | 149 | 10 | 1.642 | 23 |
| Example 2 | BisOPPFL | 50 | Bis C | 50 | 85000 | 147 | 10 | 1.642 | 23 |
| Example 3 | BisOPPFL | 90 | Bis F | 10 | 72000 | 185 | less than 1 | 1.675 | 20 |
| Example 4 | BisOPPFL | 80 | Bis F | 20 | 85000 | 175 | less than 1 | 1.668 | 21 |

TABLE 1-continued

| | Monomer 1 | Feed ratio % mol | Monomer 2 | Feed ratio % mol | Mw | Tg [° C.] | MVR (g/10 cm³) | Refractive index (nD) | Abbe's number (ν) |
|---|---|---|---|---|---|---|---|---|---|
| Example 5 | BisOPPFL | 50 | Bis F | 50 | 90000 | 151 | 10 | 1.662 | 22 |
| Example 6 | BisOPPFL | 40 | Bis F | 60 | 71000 | 129 | 20 | 1.660 | 22 |
| Example 7 | BisOPPFL | 10 | Bis F | 90 | 67000 | 108 | 40 | 1.652 | 28 |
| Example 8 | BisOPPFL | 90 | Bis M | 10 | 85000 | 181 | less than 1 | 1.670 | 21 |
| Example 9 | BisOPPFL | 80 | Bis M | 20 | 85000 | 163 | less than 1 | 1.667 | 21 |
| Example 10 | BisOPPFL | 60 | Bis M | 40 | 89000 | 135 | 10 | 1.652 | 23 |
| Example 11 | BisOPPFL | 50 | Bis M | 50 | 67000 | 129 | 20 | 1.646 | 23 |
| Example 12 | BisOPPFL | 20 | Bis M | 80 | 69000 | 79 | 40 | 1.628 | 27 |
| Example 13 | BisOPPFL | 10 | Bis M | 90 | 70000 | 72 | 40 | 1.622 | 28 |
| Example 14 | BisOPPFL | 50 | BisOSBP | 50 | 66000 | 114 | 30 | 1.631 | 23 |
| Comparative Example 1 | Bis A | 100 | Not added | 0 | 67000 | 86 | 40 | 1.612 | 30 |
| Comparative Example 2 | Bis C | 100 | Not added | 0 | 63000 | 86 | 40 | 1.610 | 30 |
| Comparative Example 3 | Bis F | 100 | Not added | 0 | 34000 | 48 | greater than 100 | 1.648 | 28 |
| Comparative Example 4 | Bis M | 100 | Not added | 0 | 63000 | 65 | greater than 100 | 1.616 | 29 |
| Comparative Example 5 | BisOSBP | 100 | Not added | 0 | 63000 | 31 | greater than 100 | 1.600 | 24 |
| Comparative Example 6 | BPF | 100 | Not added | 0 | 83000 | 217 | less than 1 | 1.667 | 22 |

INDUSTRIAL APPLICABILITY

Since a polyformal resin copolymer of the present invention has a high refractive index and good moldability, it can favorably be used for an optical molded body such as an optical lens or an optical film.

In particular, a polyformal resin copolymer of the present invention that does not contain sulfur can prevent a molding machine or a mold from corroding.

The invention claimed is:

1. A polyformal resin copolymer comprising a structural unit (a) having a fluorine structure with bisphenol moieties as represented by General Formula (1) and a structural unit (b) represented by General Formula (2), wherein the proportions of the structural unit (a) and the structural unit (b) are in a range of 1:99 to 99:1 in a molar ratio:

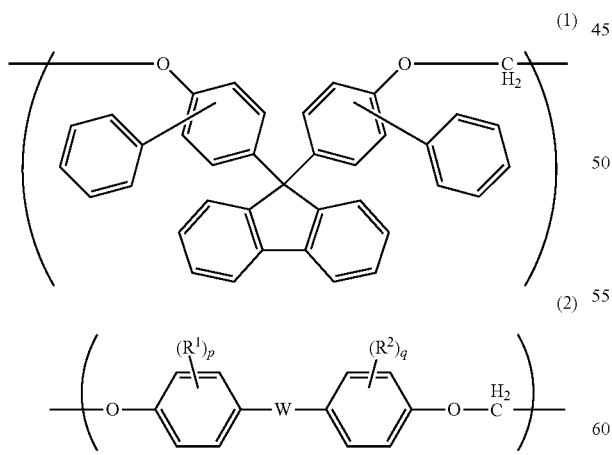

where, in General Formula (2), $R^1$ and $R^2$ are each independently a hydrocarbon group with a carbon atom number of 1 to 9 that does not contain an aromatic group or a halogen atom, p and q represent identical or different integers of 0 to 4, and W is any one of Formula (3) below:

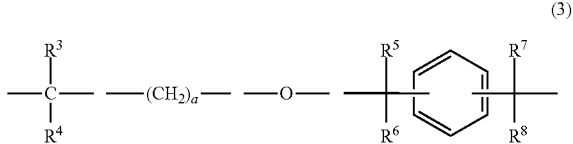

wherein, $R^3$ and $R^4$ each represent a hydrogen atom, a fluorine atom, a chlorine atom, a bromine atom, an iodine atom, an alkyl group with a carbon atom number of 1 to 9, an alkoxy group with a carbon atom number of 1 to 5, an aryl group with a carbon atom number of 6 to 12, an alkenyl group with a carbon atom number of 2 to 5 or an aralkyl group with a carbon atom number of 7 to 17; $R^3$ and $R^4$ may also bind to each other and form a carbocyclic ring or a heterocyclic ring; $R^5$ to $R^8$ each represent a hydrogen atom, a fluorine atom, a chlorine atom, a bromine atom, an iodine atom, an alkyl group with a carbon atom number of 1 to 9, an alkoxy group with a carbon atom number of 1 to 5 or an aryl group with a carbon number of 6 to 12; and a represents an integer of 1 to 20.

2. A method for producing the polyformal resin copolymer according to claim 1, comprising a step of allowing reaction among dihydric phenol represented by General Formula (4), dihydric phenol represented by General Formula (5) and methylene halide:

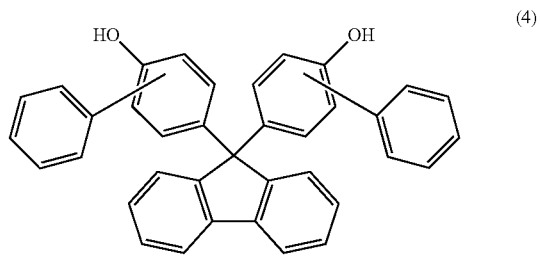

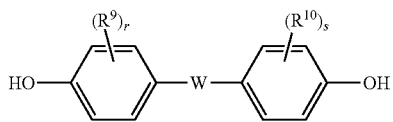

where, in General Formula (5), $R^9$ and $R^{10}$ are each independently a hydrocarbon group with a carbon atom number of 1 to 9 that does not contain an aromatic group or a halogen atom, r and s represent identical or different integers of 0 to 4, and W is any one of General Formula (6) below:

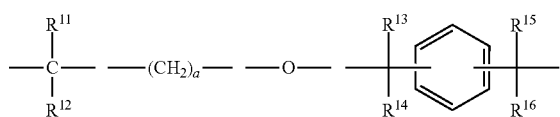

wherein, $R^{11}$ and $R^{12}$ each represent a hydrogen atom, a fluorine atom, a chlorine atom, a bromine atom, an iodine atom, an alkyl group with a carbon atom number of 1 to 9, an alkoxy group with a carbon atom number of 1 to 5, an aryl group with a carbon atom number of 6 to 12, an alkenyl group with a carbon atom number of 2 to 5 or an aralkyl group with a carbon atom number of 7 to 17; $R^{11}$ and $R^{12}$ may also bind to each other and form a carbocyclic ring or a heterocyclic ring; $R^{13}$ to $R^{16}$ each represent a hydrogen atom, a fluorine atom, a chlorine atom, a bromine atom, an iodine atom, an alkyl group with a carbon atom number of 1 to 9, an alkoxy group with a carbon atom number of 1 to 5 or an aryl group with a carbon number of 6 to 12; and a represents an integer of 1 to 20.

3. An optical molded body produced from the polyformal resin copolymer according to claim 1.

4. An optical lens produced from the polyformal resin copolymer according to claim 1.

5. The optical lens according to claim 4 produced from a polyformal resin copolymer whose refractive index is in a range of 1.600 to 1.680 and whose glass-transition temperature is 110° C. to 200° C.

6. The polyformal resin copolymer according to claim 1, wherein the refractive index is in a range of 1.600 to 1.680 and the glass-transition temperature is 110° C. to 200° C.

* * * * *